(12) United States Patent
Mizukami et al.

(10) Patent No.: US 10,476,329 B2
(45) Date of Patent: Nov. 12, 2019

(54) MOTOR INCLUDING A SEAL COVERING A HIGH REFLECTIVITY METALLIC SURFACE OF A ROTOR HUB

(71) Applicant: Nidec Corporation, Kyoto (JP)

(72) Inventors: Junya Mizukami, Kyoto (JP); Yoichi Sekii, Kyoto (JP); Takeyuki Shuto, Kyoto (JP); Naohiro Nagasawa, Kyoto (JP)

(73) Assignee: VALVE CORPORATION, Bellevue, WA (US)

( * ) Notice: Subject to any disclaimer, the term of this patent is extended or adjusted under 35 U.S.C. 154(b) by 154 days.

(21) Appl. No.: 15/641,392

(22) Filed: Jul. 5, 2017

(65) Prior Publication Data

US 2018/0054102 A1 Feb. 22, 2018

(30) Foreign Application Priority Data

Aug. 18, 2016 (JP) .................................. 2016-160302

(51) Int. Cl.
*H02K 7/02* (2006.01)
*G02B 26/00* (2006.01)
(Continued)

(52) U.S. Cl.
CPC ......... *H02K 1/2786* (2013.01); *F16C 17/026* (2013.01); *F16C 17/107* (2013.01);
(Continued)

(58) Field of Classification Search
CPC .. H02K 5/00; H02K 5/02; H02K 5/10; H02K 5/12; H02K 5/124; H02K 5/16;
(Continued)

(56) References Cited

U.S. PATENT DOCUMENTS

| 6,236,129 B1* | 5/2001 | Yamashita | ............ F16C 17/107 257/E23.099 |
| 6,384,495 B1* | 5/2002 | Suzuki | ................. G11B 25/043 310/67 R |

(Continued)

FOREIGN PATENT DOCUMENTS

JP 4572554 B2 11/2010

*Primary Examiner* — Tran N Nguyen
(74) *Attorney, Agent, or Firm* — Lee & Hayes, P.C.

(57) ABSTRACT

This motor includes a stationary portion including a stator; and a rotating portion supported to be rotatable about a central axis extending in a vertical direction with respect to the stationary portion, and including a shaft arranged to extend along the central axis. The stationary portion includes a bearing arranged to rotatably support the shaft, and a base portion arranged to hold the stator. The rotating portion includes a rotor hub portion arranged to extend in an annular shape around the shaft; a magnet directly or indirectly fixed to the rotor hub portion, and arranged opposite to the stator; a flywheel arranged axially above the rotor hub portion; and a seal portion arranged to have a thickness smaller than the thickness of the magnet. At least a portion of an outer circumferential surface of the rotor hub portion is a metal surface. The metal surface has a reflectivity higher than the reflectivity of an outer circumferential surface of the flywheel and the reflectivity of a surface of the seal portion. The metal surface is covered with the seal portion.

20 Claims, 11 Drawing Sheets

(51) Int. Cl.
*H02K 1/27* (2006.01)
*F16C 17/02* (2006.01)
*F16C 17/10* (2006.01)
*F16C 33/10* (2006.01)
*H02K 7/08* (2006.01)

(52) U.S. Cl.
CPC .......... *F16C 33/107* (2013.01); *G02B 26/008* (2013.01); *H02K 7/02* (2013.01); *H02K 7/085* (2013.01); *H02K 7/086* (2013.01); *F16C 2380/26* (2013.01); *Y02E 60/16* (2013.01)

(58) Field of Classification Search
CPC H02K 5/167; H02K 7/00; H02K 7/02; H02K 7/04; H02K 7/08; H02K 7/14; H02K 21/22; G03B 21/00; G11B 19/00; G11B 19/20; G11B 19/2009; G11B 25/00; G11B 25/04; G11B 25/043; G11B 33/00; G11B 33/12; G11B 33/121; G02B 26/00; G02B 26/008; G02B 26/08; G02B 26/0816; G02B 26/0833; G02B 26/10; F16C 17/00; F16C 17/02; F16C 17/026; F16C 17/10; F16C 17/107; F16C 33/00; F16C 33/10; F16C 33/107

See application file for complete search history.

(56) References Cited

U.S. PATENT DOCUMENTS

| | | | |
|---|---|---|---|
| 6,755,554 B2* | 6/2004 | Ohmae | F21S 10/007 348/743 |
| 7,109,620 B2* | 9/2006 | Fujii | F16C 33/103 310/67 R |

* cited by examiner

US 10,476,329 B2

MOTOR INCLUDING A SEAL COVERING A HIGH REFLECTIVITY METALLIC SURFACE OF A ROTOR HUB

CROSS REFERENCE TO RELATED APPLICATIONS

This application claims the benefit of priority to Japanese Patent Application No. 2016-160302 filed on Aug. 18, 2016. The entire contents of this application are hereby incorporated herein by reference.

BACKGROUND OF THE INVENTION

1. Field of the Invention

The present invention relates to a motor.

2. Description of the Related Art

A motor for use in a DLP (digital light processing) single-chip projector is described in JP-A 2005-278309. In this projector, light emitted from a light source passes through a color wheel that rotates along with rotation of the motor. The light passing through the color wheel is converted into light in one of RGB bands. This light impinges on a digital micromirror device, and then, the light reflected from the digital micromirror device is guided onto a predetermined screen to display an image on the screen.

SUMMARY OF THE INVENTION

In the case of a motor used in a device that manipulates light, such as the motor described in JP-A 2005-278309, reflection of light emitted from a light source by an outer circumferential surface of the motor may cause a diffuse reflection. Such a diffuse reflection causes noise in output light to be outputted from the device. In particular, in the motor described in JP-A 2005-278309, a surface of a rotor hub is made of a metal material. Therefore, light emitted from the light source and reflected by the metal surface of the rotor hub tends to easily cause a diffuse reflection of light.

The present invention has been conceived to reduce reflection of light by an outer circumferential surface of a rotating portion of a motor.

A motor according to a preferred embodiment of the present invention includes a stationary portion including a stator; and a rotating portion supported to be rotatable about a central axis extending in a vertical direction with respect to the stationary portion, and including a shaft arranged to extend along the central axis. The stationary portion includes a bearing arranged to rotatably support the shaft, and a base portion arranged to hold the stator. The rotating portion includes a rotor hub portion arranged to extend in an annular shape around the shaft; a magnet directly or indirectly fixed to the rotor hub portion, and arranged opposite to the stator; a flywheel arranged axially above the rotor hub portion; and a seal portion arranged to have a thickness smaller than a thickness of the magnet. At least a portion of an outer circumferential surface of the rotor hub portion is a metal surface. The metal surface has a reflectivity higher than a reflectivity of an outer circumferential surface of the flywheel and a reflectivity of a surface of the seal portion. The metal surface is covered with the seal portion.

The above preferred embodiment of the present invention is able to achieve a reduction in reflection of light by an outer circumferential surface of the rotating portion. In addition, since the seal portion has a small thickness, a center of gravity of the rotating portion can be maintained radially inward, allowing stable rotation thereof.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, motors according to preferred embodiments of the present invention will be described. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a flywheel is arranged with respect to a rotor hub portion is an upper side, and the shape of each member or portion and relative positions of different members or portions will be described based on the above assumptions. It should be noted, however, that the above definitions of the vertical direction and the upper and lower sides are not meant to restrict in any way the orientation of a motor according to any preferred embodiment of the present invention at the time of manufacture or when in use.

1. First Preferred Embodiment

Figure 1:
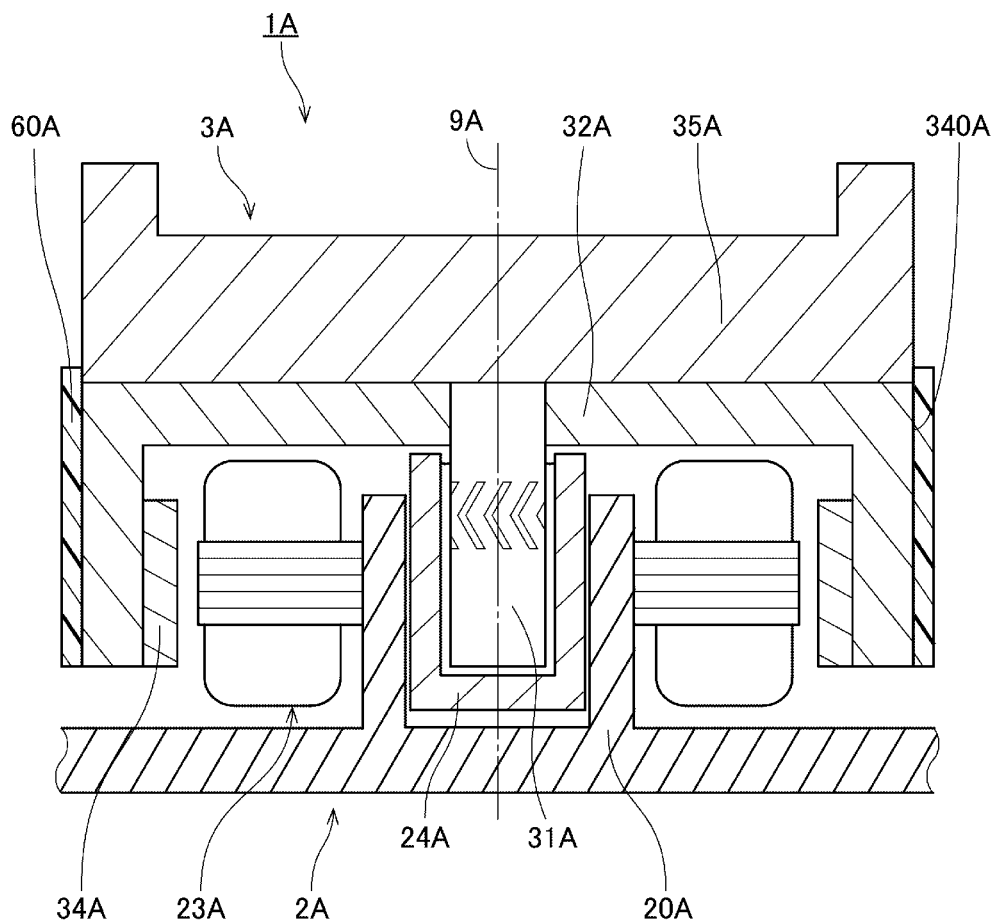
FIG. 1 is a vertical sectional view of a motor according to a first preferred embodiment of the present invention.

FIG. 1 is a vertical sectional view of a motor 1A according to a first preferred embodiment of the present invention. Referring to FIG. 1, the motor 1A includes a rotating portion 3A and a stationary portion 2A including a stator 23A. The rotating portion 3A is supported to be rotatable about a central axis 9A extending in the vertical direction with respect to the stationary portion 2A.

The stationary portion 2A includes a bearing 24A arranged to rotatably support a shaft 31A, which will be described below, and a base portion 20A arranged to hold the stator 23A.

The rotating portion 3A includes a rotor hub portion 32A, a magnet 34A, a flywheel 35A, and a seal portion 60A. The rotating portion 3A includes the shaft 31A, which is columnar and is arranged to extend along the central axis 9A. Note that the shaft 31A may be defined integrally with the rotor hub portion 32A. The rotor hub portion 32A is arranged to extend in an annular shape around the shaft 31A. The magnet 34A is fixed to the rotor hub portion 32A, and includes a pole surface arranged radially opposite to the stator 23A. Note that the magnet 34A may be directly fixed to the rotor hub portion 32A, or be indirectly fixed thereto with another member therebetween. The flywheel 35A is arranged axially above the rotor hub portion 32A. The seal portion 60A is arranged to have a thickness smaller than the thickness of the magnet 34A.

At least a portion of an outer circumferential surface of the rotor hub portion 32A is a metal surface 340A. The metal surface 340A is covered with the seal portion 60A. Note that the metal surface 340A has a reflectivity higher than the reflectivity of an outer circumferential surface of the flywheel 35A and the reflectivity of a surface of the seal portion 60A. That is, the metal surface 340A, which has a relatively high reflectivity, is covered with the seal portion 60A, which has a reflectivity lower than the reflectivity of the metal surface 340A. This contributes to reducing reflection of light by an outer circumferential surface of the rotating portion 3A. In addition, since the seal portion 60A has a small thickness, a center of gravity of the rotating portion 3A can be maintained radially inward, allowing stable rotation thereof.

2. Second Preferred Embodiment 2-1. Structure of Motor

Figure 2:
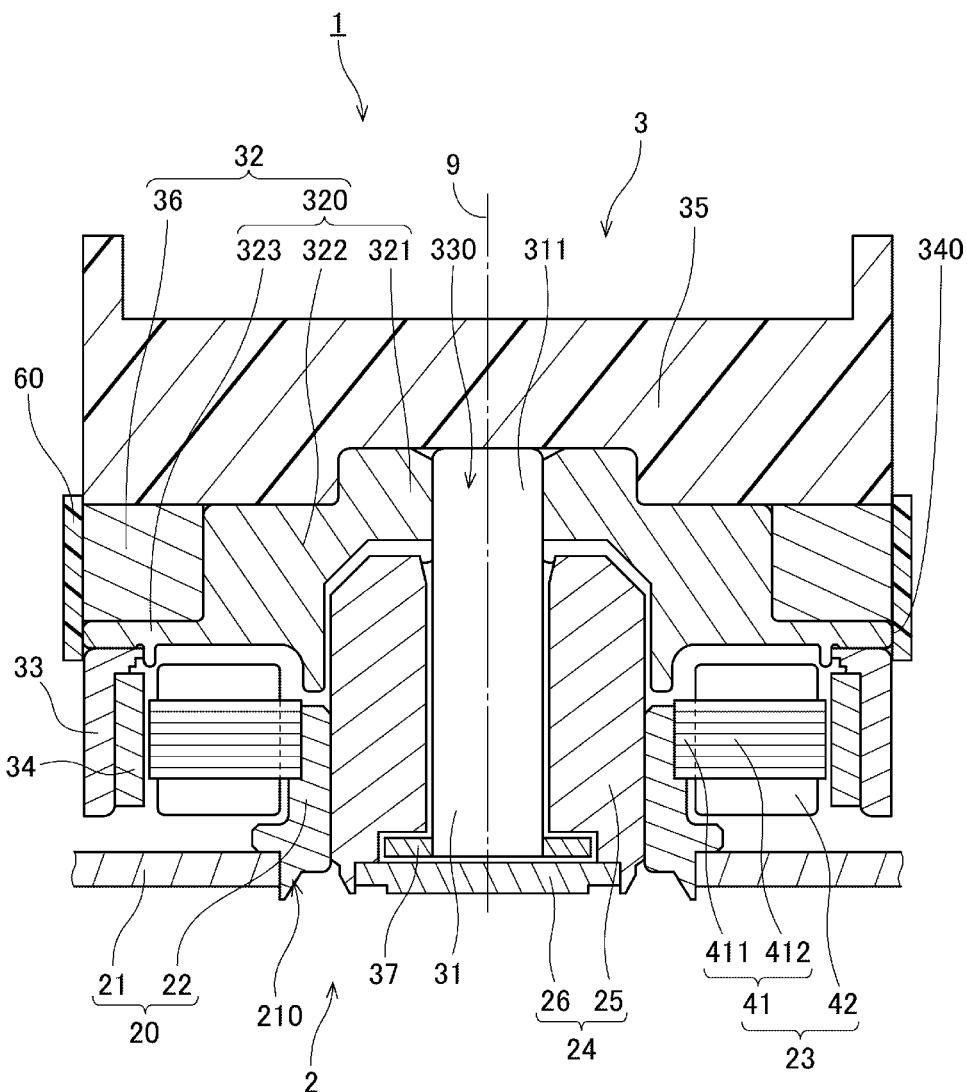
FIG. 2 is a vertical sectional view of a motor according to a second preferred embodiment of the present invention.

FIG. 2 is a vertical sectional view of a motor 1 according to a second preferred embodiment of the present invention. Referring to FIG. 2, the motor 1 includes a rotating portion 3 and a stationary portion 2 including a stator 23. The rotating portion 3 is supported to be rotatable about a central axis 9 extending in the vertical direction with respect to the stationary portion 2.

The stationary portion 2 includes a bearing 24 arranged to rotatably support a shaft 31, which will be described below, and a base portion 20 arranged to hold the stator 23. The base portion 20 includes a mounting plate 21 and a stator holder 22

The mounting plate 21 is a plate-shaped member arranged to support the stator holder 22. A metal, such as, for example, stainless steel, is used as a material of the mounting plate 21. The mounting plate 21 is arranged to be perpendicular or substantially perpendicular to the central axis 9. In addition, the mounting plate 21 includes a circular through hole 210 in which a lower end portion of the stator holder 22 is fitted. When the motor 1 is used, the mounting plate 21 is fixed to a frame of a device through, for example, screwing. Note that a circuit board to supply electric drive currents to coils 42 of the stator 23, which will be described below, may be arranged on a surface of the mounting plate 21

The stator holder 22 is a cylindrical member arranged to extend in the axial direction. The lower end portion of the stator holder 22 is inserted into the through hole 210 of the mounting plate 21, and is fixed to the mounting plate 21 by crimping. Note, however, that the stator holder 22 may alternatively be fixed to the mounting plate 21 by another method, such as, for example, welding. Also note that the mounting plate 21 and the stator holder 22 may alternatively be defined by a single continuous monolithic member.

The stator 23 includes a stator core 41 and the coils 42. The stator core 41 is defined by, for example, laminated steel sheets, each of which is a magnetic body. The stator core 41 includes a core back 411 in the shape of a circular ring, and a plurality of teeth 412. The core back 411 is fixed to an outer circumferential surface of the stator holder 22. The teeth 412 are arranged to project radially outward from the core back 411. A surface of each of the teeth 412 is coated with an insulating coating. In addition, a conducting wire is wound around each of the teeth 412 to define the coils 42. Note that an insulator made of a resin may be arranged between each of the teeth 412 and a corresponding one of the coils 42.

The bearing 24 is a member arranged to rotatably support the shaft 31, which will be described below. The bearing 24 includes a sleeve 25 arranged to extend in the axial direction to assume a cylindrical shape around the shaft 31, and a disk-shaped cap 26 arranged to close an opening at a lower end portion of the sleeve 25. A lower portion of the sleeve 25 is inserted into a space radially inside of the stator holder 22, and is fixed to the stator holder 22 through, for example, an adhesive. An upper end portion of the sleeve 25 is arranged axially above an upper end portion of the stator holder 22 and an upper end portion of the stator 23.

The rotating portion 3 includes a rotor hub portion 32, a yoke 33, a magnet 34, a flywheel 35, and a seal portion 60, which will be described below. The rotating portion 3 includes the shaft 31, which is columnar and is arranged to extend along the central axis 9. The shaft 31 may be defined integrally with the rotor hub portion 32 or be defined by a member separate from the rotor hub portion 32. The rotor hub portion 32 includes a hub 320 and an inertia portion 36. Note that the rotor hub portion 32 may alternatively be defined by only the hub 320. A detailed description thereof will be provided below.

A metal, such as, for example, stainless steel, is used as a material of the shaft 31. A lower portion of the shaft 31 is arranged radially inside of the sleeve 25. Meanwhile, an upper end portion 311 of the shaft 31 is arranged axially above the upper end portion of the sleeve 25. An outer circumferential surface of the shaft 31 and an inner circumferential surface of the sleeve 25 are arranged radially opposite to each other with a slight gap therebetween.

In addition, a disk-shaped annular portion 37 is fixed to a lower end portion of the shaft 31. The annular portion 37 is arranged to extend radially outward from a lower end of the shaft 31. An upper surface of the annular portion 37 and a lower surface of the sleeve 25 are arranged axially opposite to each other with a slight gap therebetween. In addition, a lower surface of the annular portion 37 and an upper surface of the cap 26 are arranged axially opposite to each other with a slight gap therebetween. Note that the shaft 31 and the annular portion 37 may alternatively be defined by a single monolithic member.

The rotor hub portion 32 is arranged to extend in an annular shape around the shaft 31. The rotor hub portion 32 includes the inertia portion 36, which is annular, is made of a metal, and is arranged to have a specific gravity greater than the specific gravity of the flywheel 35, which will be described below, and the hub 320, to which the inertia portion 36 is fixed. A metal, such as, for example, a stainless metal, an aluminum alloy, or the like, is used as a material of the hub 320. Referring to FIG. 2, the hub 320 includes a joining portion 321, a cylindrical portion 322, and a flange portion 323. The joining portion 321 is arranged most radially inward in the rotor hub portion 32, and is fixed to the outer circumferential surface of the shaft 31. That is, the joining portion 321 is arranged to extend in an annular shape from an upper portion of the shaft 31. A through hole 330 passing through the rotor hub portion 32 in the axial direction is defined radially inside of the joining portion 321. The upper end portion 311 of the shaft 31 is press fitted in the through hole 330 of the rotor hub portion 32.

Further, an adhesive (not shown) is arranged between an outer circumferential surface of the upper end portion 311 of the shaft 31 and an inner circumferential surface of the joining portion 321. Thus, in this motor 1, the shaft 31 and the rotor hub portion 32 are fixed to each other through press fitting and the adhesive. Note, however, that the shaft 31 and the rotor hub portion 32 may alternatively be fixed to each other through only press fitting or through only the adhesive. Also note that the shaft 31 and the rotor hub portion 32 may alternatively be fixed to each other by another method, such as, for example, shrink fitting.

The cylindrical portion 322 of the rotor hub portion 32 is arranged to extend in the axial direction to assume a cylindrical shape radially outside of the joining portion 321 and radially inside of the inertia portion 36. The flange portion 323 is arranged to extend radially outward from a lower portion of the cylindrical portion 322. The flange portion 323 is arranged axially below the inertia portion 36.

The inertia portion 36 is an annular member arranged radially outside of the cylindrical portion 322, axially above the flange portion 323, and axially below the flywheel 35, which will be described below. A lower surface of the inertia portion 36 is arranged to be in contact with an upper surface of the flange portion 323. In addition, the inertia portion 36 is fixed to the cylindrical portion 322 or the flange portion 323 through, for example, an adhesive. Accordingly, the inertia portion 36 rotates together with the hub 320 and the flywheel 35 while the motor 1 is running.

A metal, such as, for example, stainless steel, is used as a material of at least a portion of the rotor hub portion 32, including the inertia portion 36. The inertia portion 36 is arranged to have a specific gravity greater than the specific gravity of the flywheel 35, which will be described below. Accordingly, provision of the inertia portion 36 increases an inertial force of the rotating portion 3 while the motor 1 is running. This contributes to stabilizing the posture of the rotating portion 3. In particular, in this motor 1, the rotor hub portion 32 is arranged to have a total mass greater than the mass of the flywheel 35. Thus, a center of gravity of the rotating portion 3 is lowered, resulting in a more stable posture of the rotating portion 3. Note that the inertia portion 36 may not necessarily be arranged to have a mass greater than the mass of the flywheel 35. That is, the inertia portion 36 may be arranged to have a mass smaller than the mass of the flywheel 35.

As described above, in this motor 1, the lower surface of the inertia portion 36 is arranged to be in contact with the upper surface of the flange portion 323. This stabilizes the axial position of the inertia portion 36. In addition, in this motor 1, the inertia portion 36 is arranged above the flange portion 323 and below the flywheel 35. That is, the inertia portion 36 is held between the rotor hub portion 32 and the flywheel 35. This further stabilizes the axial position of the inertia portion 36. The stabilized axial position of the inertia portion 36 contributes to preventing a tilt of the inertia portion 36. This contributes to further stabilizing the posture of the rotating portion 3 while the motor 1 is running.

The yoke 33 is cylindrical, is fixed to a radially outer side of the magnet 34, which will be described below, and is arranged to hold the magnet 34, and at least an outer circumferential surface of the yoke 33 is, for example, black, gray, or green in color. An outer circumferential surface of the magnet 34 is fixed to an inner circumferential surface of the yoke 33. The yoke 33 is arranged to be substantially coaxial with the central axis 9. An upper end portion of the yoke 33 is fixed to a lower surface of the flange portion 323 of the rotor hub portion 32 through an adhesive or by crimping, for example. A magnetic material such as iron or the like is used as a material of the yoke 33. Accordingly, the yoke 33 has a specific gravity greater than the specific gravity of the rotor hub portion 32 when the rotor hub portion 32 is made of a metal such as aluminum or the like. Thus, the mass of the yoke 33 contributes to increasing the inertial force of the rotating portion 3. This leads to a more stable posture of the rotating portion 3 while the motor 1 is running.

The magnet 34 is fixed to the inner circumferential surface of the yoke 33 through, for example, an adhesive. In this motor 1, a permanent magnet in the shape of a circular ring is used as the magnet 34. The magnet 34 is cylindrical or substantially cylindrical in shape, and is arranged radially outside of the stator 23. An inner circumferential surface of the magnet 34 includes north and south poles arranged to alternate with each other in a circumferential direction. In addition, the inner circumferential surface of the magnet 34 is arranged radially opposite to a radially outer end surface of each of the teeth 412 of the stator 23 with a slight gap therebetween. That is, the magnet 34 includes a pole surface arranged radially opposite to the stator 23. Note that a plurality of magnets may be used in place of the magnet 34 in the shape of a circular ring. In the case where the plurality of magnets are used, the plurality of magnets 34 are arranged on the inner circumferential surface of the yoke 33 such that north and south poles alternate with each other in the circumferential direction. In the present preferred embodiment, the magnet 34 is indirectly fixed to the rotor hub portion 32 with the yoke 33 intervening therebetween. Note that the magnet 34 may alternatively be directly fixed to the rotor hub portion 32 without the yoke 33 intervening therebetween.

Once electric drive currents are supplied to the coils 42 of the stator 23, a rotating magnetic field is generated around the teeth 412 of the stator core 41. Then, interaction between magnetic flux of the teeth 412 and magnetic flux of the magnet 34 produces a circumferential torque. As a result, the rotating portion 3, which includes the magnet 34, is caused to rotate about the central axis 9.

The flywheel 35 is arranged axially above the rotor hub portion 32. The flywheel 35 is fixed to the rotor hub portion 32 through, for example, an adhesive. Accordingly, the flywheel 35 rotates together with the rotor hub portion 32. An ABS resin, which is a thermoplastic resin, for example, is used as a material of the flywheel 35. Note that, instead of the ABS resin, another material, such as, for example, a thermosetting resin or a metal, may alternatively be used as the material of the flywheel 35. The flywheel 35 is able to achieve a lower weight when the flywheel 35 is made of a resin than when the flywheel 35 is made of a metal. Use of a resin for the flywheel 35 therefore leads to reducing a load during rotation of the motor 1. Note that the flywheel 35 may be arranged to have an axial dimension greater than an axial distance from a lower end surface of the stationary portion 2 to an upper end surface of the rotor hub portion 32. The posture of the rotating portion 3 while the motor 1 is running can be stabilized by arranging the inertia portion 36, which has a specific gravity greater than that of the flywheel 35, below the flywheel 35 as described above.

In addition, in this motor 1, the flywheel 35 is arranged to have a circular external shape with the central axis 9 as a center when viewed in the axial direction. This circular external shape of the flywheel 35 contributes to reducing swinging of the rotating portion 3 while the motor 1 is running.

2-2. Detailed Structure of Outer Circumferential Surface of Rotating Portion

Next, the detailed structure of an outer circumferential surface of the rotating portion 3 of the motor 1 will now be described below.

Figure 3:
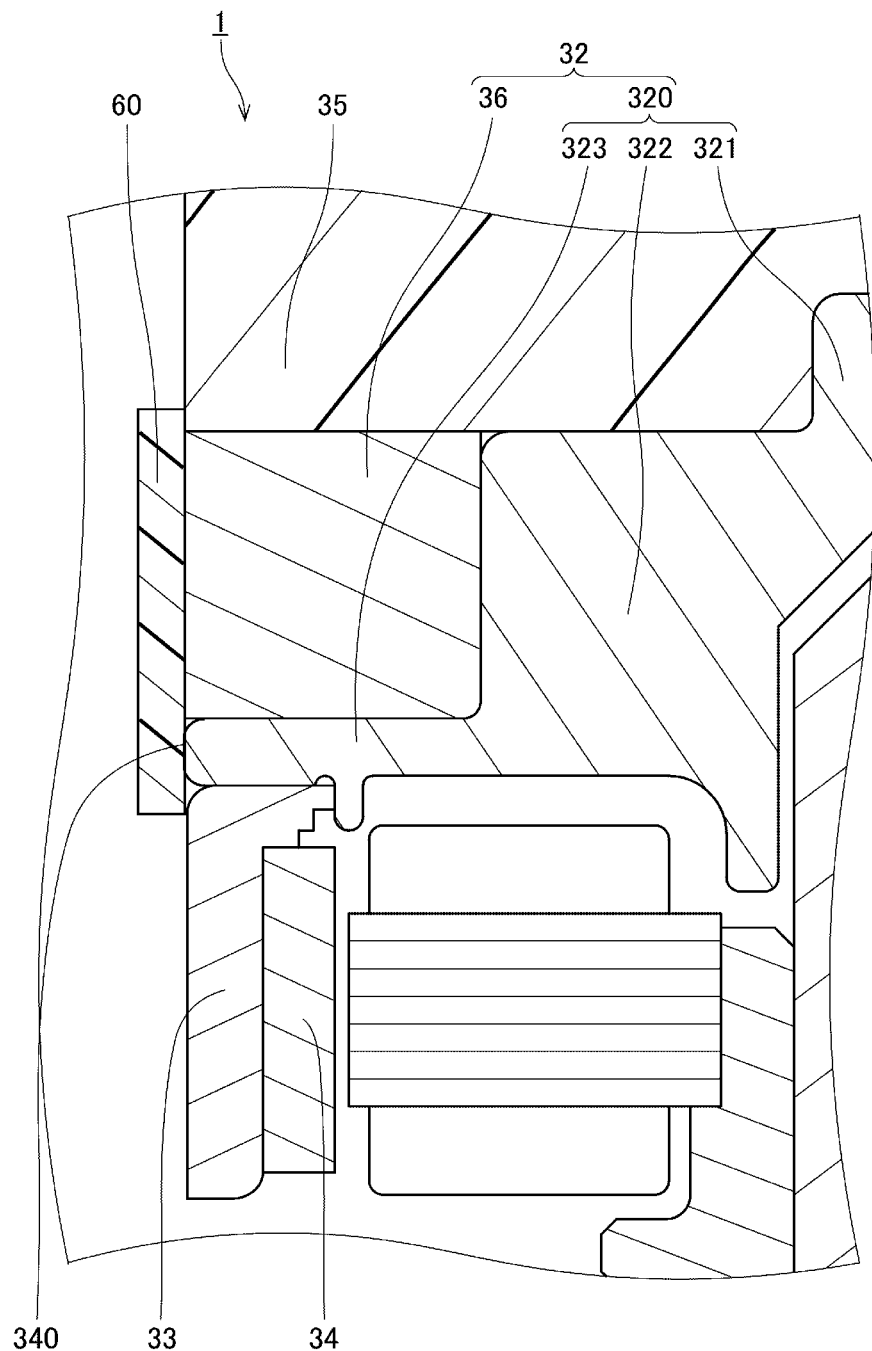
FIG. 3 is a partial vertical sectional view of the motor according to the second preferred embodiment.

FIG. 3 is a partial vertical sectional view of the motor 1 according to the second preferred embodiment. Referring to FIG. 3, at least a portion of an outer circumferential surface of the flange portion 323 of the rotor hub portion 32 is a metal surface 340. Note that an outer circumferential surface of the rotor hub portion 32 refers to any surface of the rotor hub portion 32 that is exposed to a space outside of the motor 1 when the rotor hub portion 32 is not covered with the seal portion 60, and may include a side surface, an upper surface, a lower surface, or a slanting surface. In the present preferred embodiment, the metal surface 340 is arranged in a radially outer side surface of the flange portion 323.

The metal surface 340 is preferably a cut surface on which a surface treatment process has not been performed. The metal surface 340 has a reflectivity higher than the reflectivity of an outer circumferential surface of the flywheel 35 and the reflectivity of a surface of the seal portion 60, which will be described below. For example, the flywheel 35 is made of a resin, and the metal surface 340 is made of a metal, such as, for example, a stainless metal or aluminum, and in this case, the outer circumferential surface of the flywheel 35 has a reflectivity lower than the reflectivity of the metal surface 340. Note that a coating having a reflectivity lower than the reflectivity of the metal surface 340 may be applied on the outer circumferential surface of the flywheel 35 instead of or in addition to the flywheel 35 being made of a resin. Also note that a tape made of a material having a low reflectivity may be stuck on the outer circumferential surface of the flywheel 35.

Further, the rotor hub portion 32 is preferably arranged to have an outside diameter equal to or substantially equal to the outside diameter of the flywheel 35. Specifically, it is desirable that at least a portion of the metal surface 340 of the rotor hub portion 32 and at least a portion of the outer circumferential surface of the flywheel 35 be arranged to axially overlap with each other. An increase in the outside diameter of the rotor hub portion 32 leads to an increase in the mass of the rotating portion 3, which includes the rotor hub portion 32, which has a large specific gravity. This in turn leads to an increase in the inertial force of the rotating portion 3, stabilizing the rotation thereof. In addition, since the rotor hub portion 32 and the flywheel 35 have an equal or substantially equal outside diameter, the seal portion 60, which will be described below, can be easily fixed. Note that the outside diameter of the rotor hub portion 32 and the outside diameter of the flywheel 35 may be slightly different from each other.

This motor 1 is placed inside of a case, and a mirror (not shown) is used to reflect light emitted from a light source. If the metal surface 340, which has a high reflectivity, were exposed, a portion of the light emitted from the light source would be reflected by the metal surface 340. Then, the reflected light would cause a diffuse reflection inside of the case. Thus, the light reflected by the mirror and light reflected by the metal surface 340 might intermingle to spoil a wanted function to be carried out by the reflected light.

Referring to FIG. 3, in the present preferred embodiment, the metal surface 340 is covered with the seal portion 60, which has a thickness smaller than the thickness of the magnet 34. Accordingly, the light emitted from the light source is blocked by the seal portion 60, and does not reach the metal surface 340. In addition, the seal portion 60 is arranged to have a reflectivity lower than the reflectivity of the metal surface 340. Thus, a portion of incoming light is absorbed by the surface of the seal portion 60, which reduces the occurrence of diffuse reflection inside of the case. In addition, since the seal portion 60 is arranged to have a small thickness, the center of gravity of the rotating portion 3 can be maintained radially inward. This contributes to further stabilizing the rotation thereof.

Here, it is desirable that the surface of the seal portion 60 be in a color that does not easily allow reflection, such as black, dark green, gray, or the like, and that the seal portion 60 be defined by a tape made of a resin or an opaque material, and be arranged to have a thickness of 30 μm or more and sufficient strength. In addition, it is sufficient if the metal surface 340 is covered by the seal portion 60 over the entire circumferential extent thereof, and both circumferential end portions of the seal portion 60 may overlap with each other or be slightly displaced from each other. Note that the metal surface 340 may be covered with multiple layers of the seal portion 60 over the entire circumferential extent thereof.

In the present preferred embodiment, an upper end of the seal portion 60 is fixed to the outer circumferential surface of the flywheel 35 through, for example, an adhesive, and at least a portion of the outer circumferential surface of the flywheel 35, including a lower end thereof, is covered with the seal portion 60. In addition, a lower end of the seal portion 60 is fixed to the outer circumferential surface of the yoke 33 through, for example, an adhesive, and at least a portion of the outer circumferential surface of the yoke 33, including an upper end thereof, is covered with the seal portion 60. As a result, the metal surface 340 of the rotor hub portion 32, which has a high reflectivity, and the inertia portion 36 are securely covered by the seal portion 60. In addition, the likelihood that light will reach a gap between the flange portion 323 and the inertia portion 36 or a gap between the flange portion 323 and the yoke 33 to cause a diffuse reflection is reduced. Note, however, that the upper end and the lower end of the seal portion 60 may not necessarily be fixed to the outer circumferential surface of the flywheel 35 and the outer circumferential surface of the yoke 33, respectively, as long as the seal portion 60 covers the metal surface 340. For example, the upper end of the seal portion 60 may alternatively be fixed to an outer circumferential surface of the inertia portion 36 in the vicinity of a top of the inertia portion 36.

Note that, in order to reduce the likelihood that incoming light will impinge on the surface of the seal portion 60, the outer circumferential surface of the flywheel 35, or the outer circumferential surface of the yoke 33 and be diffusely reflected to the surroundings, it is desirable that at least the surface of the seal portion 60 and the outer circumferential surfaces of the flywheel 35 and the yoke 33 have a low light reflectivity. Accordingly, it is desirable that the outer circumferential surface of the yoke 33 be roughened. Examples of roughening methods include a method of forming processing marks on the outer circumferential surface with a cutting process or press working; a method of performing shot blasting of blowing abrasive, such as, for example, sand, against the outer circumferential surface; a method of applying a resin in which minute particles are dispersed onto the outer circumferential surface and solidifying the resin; a method of applying a chemical solvent onto the outer circumferential surface to dissolve the surface; and a method of spraying a chemical solvent onto the outer circumferential surface using a spray.

Note that, in order to reduce the reflectivity, a plating process and an oxidation treatment may be performed, instead of roughening the outer circumferential surface of the yoke 33. Also note that a member made of a metal or a resin and having a reflectivity lower than the reflectivity of the metal surface 340 of the rotor hub portion 32 may be fixed to the outer circumferential surface of the yoke 33, that a coating having a reflectivity lower than the reflectivity of the metal surface 340 may be applied onto the outer circumferential surface of the yoke 33, or that a tape made of such a material may be stuck on the outer circumferential surface of the yoke 33.

2-3. Fluid Dynamic Bearing

Figure 4:
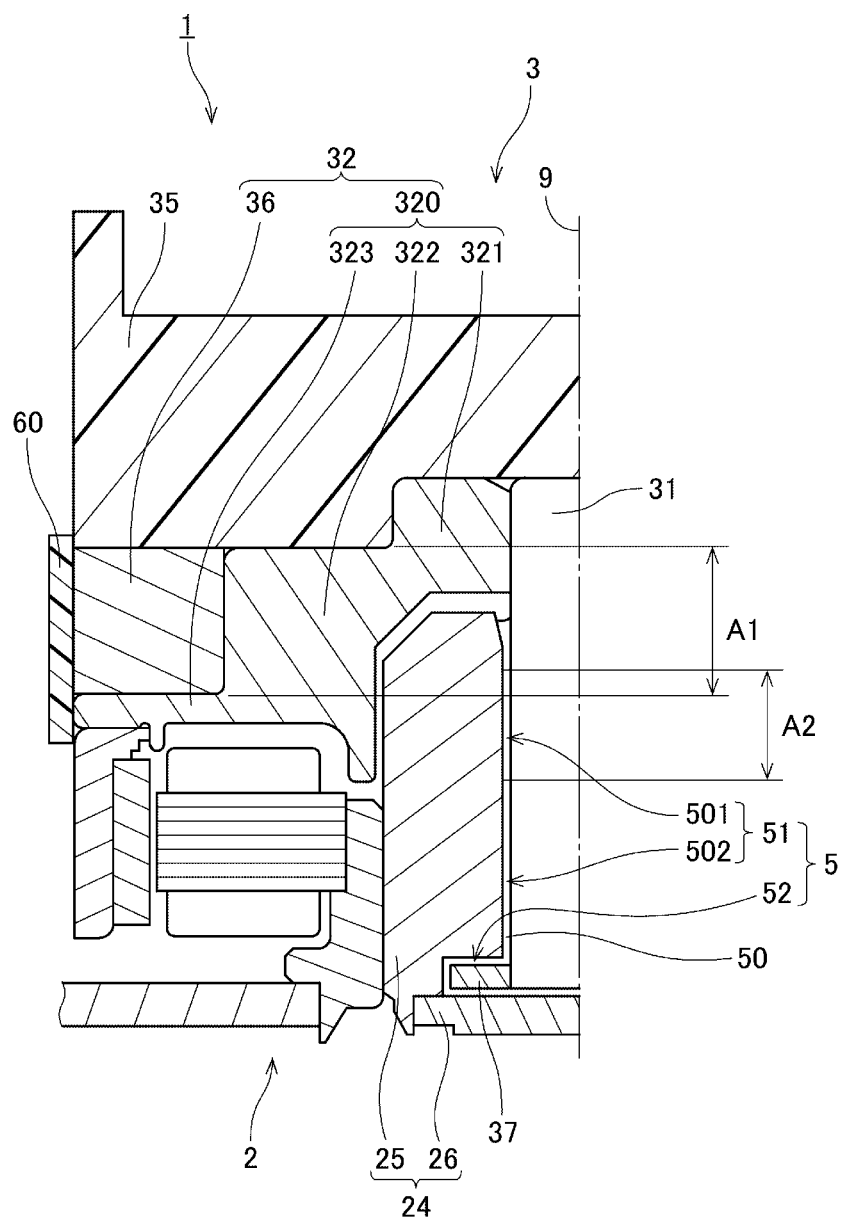
FIG. 4 is a partial vertical sectional view of the motor according to the second preferred embodiment.

Next, a fluid dynamic bearing 5 included in the motor 1 will now be described below. FIG. 4 is a partial vertical sectional view of the motor 1. Referring to FIG. 4, a lubricating oil 50 is arranged between the bearing 24, which includes the sleeve 25 and the cap 26, and a combination of the shaft 31 and the annular portion 37. A polyolester oil or a diester oil, for example, is used as the lubricating oil 50.

Figure 5:
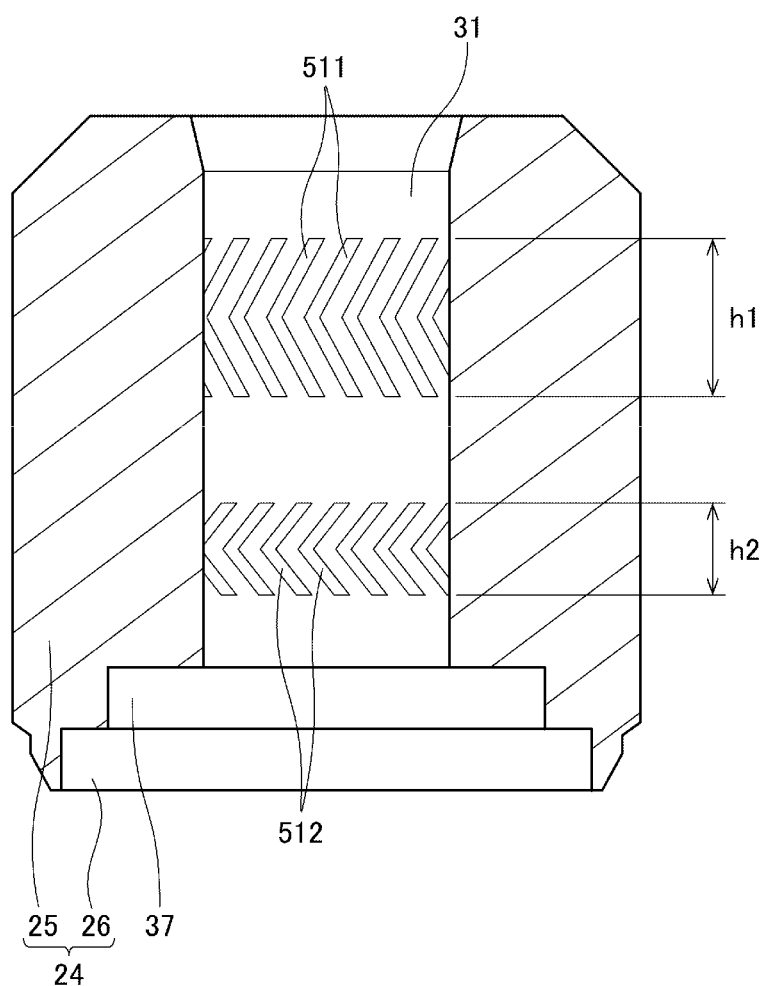
FIG. 5 is a vertical sectional view of a bearing according to the second preferred embodiment.

FIG. 5 is a vertical sectional view of the bearing 24. Referring to FIG. 5, the sleeve 25 includes an upper radial groove array 511 and a lower radial groove array 512 in the inner circumferential surface thereof. The lower radial groove array 512 is arranged axially below the upper radial groove array 511. Each of the upper and lower radial groove arrays 511 and 512 is a groove array arranged in a so-called herringbone pattern. While the motor 1 is running, the upper and lower radial groove arrays 511 and 512 induce a dynamic pressure in a portion of the lubricating oil 50 which is present between the inner circumferential surface of the sleeve 25 and the outer circumferential surface of the shaft 31. This produces a radial supporting force between the sleeve 25 and the shaft 31.

That is, in this motor 1, the inner circumferential surface of the sleeve 25 and the outer circumferential surface of the shaft 31 are arranged radially opposite to each other with the lubricating oil 50 therebetween to define a radial bearing portion 51. In addition, the radial bearing portion 51 includes an upper radial bearing portion 501 arranged to generate a dynamic pressure through the upper radial groove array 511, and a lower radial bearing portion 502 arranged to generate a dynamic pressure through the lower radial groove array 512. The lower radial bearing portion 502 is arranged axially below the upper radial bearing portion 501. Note that it may be sufficient if each of the upper and lower radial groove arrays 511 and 512 is defined in at least one of the inner circumferential surface of the sleeve 25 and the outer circumferential surface of the shaft 31. Also note that the number of radial dynamic pressure groove arrays may alternatively be one or more than two.

In addition, referring to FIG. 5, in this motor 1, an axial dimension h1 of the upper radial groove array 511 is arranged to be greater than an axial dimension h2 of the lower radial groove array 512. Therefore, an axial dimension of the upper radial bearing portion 501 is greater than an axial dimension of the lower radial bearing portion 502. This causes the lubricating oil 50 to generate a stronger dynamic pressure at a position closer to the center of gravity of the rotating portion 3. This leads to a more stable posture of the rotating portion 3 during the rotation thereof. This in turn leads to a reduction in the likelihood that damage to the joining portion 321 will be caused by the swinging of the rotating portion 3.

In addition, in this motor 1, at least a portion of the inertia portion 36 and at least a portion of the radial bearing portion 51 are arranged to radially overlap with each other. Specifically, referring to FIG. 4, a lower portion of an axial range A1 in which the inertia portion 36 extends is arranged to overlap with an upper portion of an axial range A2 in which the upper radial bearing portion 501 extends. Accordingly, the upper radial bearing portion 501 is able to generate a strong dynamic pressure in the lubricating oil 50 at a level equivalent to the level of the inertia portion 36, which has a large specific gravity, to support the rotating portion 3. This leads to a more stable posture of the rotating portion 3 during the rotation thereof. A stabilized posture of the rotating portion 3 leads to an additional reduction in the likelihood that damage to the joining portion 321 will be caused by the swinging of the rotating portion 3.

Figure 6:
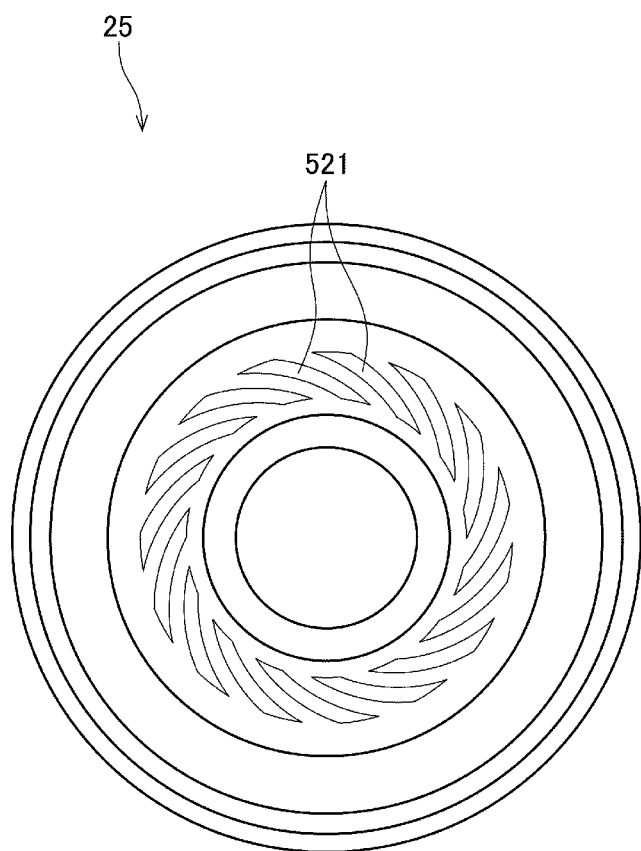
FIG. 6 is a bottom view of a sleeve according to the second preferred embodiment.

FIG. 6 is a bottom view of the sleeve 25. Referring to FIG. 6, the sleeve 25 includes a thrust groove array 521 in the lower surface thereof. The thrust groove array 521 includes a plurality of thrust grooves arranged in the circumferential direction. The thrust grooves are arranged to extend radially in a spiral shape. Note that the thrust groove array 521 may alternatively be arranged in a herringbone pattern. While the motor 1 is running, the thrust groove array 521 induces a fluid dynamic pressure in a portion of the lubricating oil 50 which is present between the lower surface of the sleeve 25 and the upper surface of the annular portion 37. This produces an axial supporting force that supports the annular portion 37 with respect to the sleeve 25, stabilizing the rotation of the rotating portion 3.

That is, in this motor 1, the lower surface of the sleeve 25 of the stationary portion 2 and the upper surface of the annular portion 37 of the rotating portion 3 are arranged axially opposite to each other with a gap in which the lubricating oil 50 exists therebetween to define a thrust bearing portion 52. Note that it may be sufficient if the thrust groove array 521 is defined in at least one of the lower surface of the sleeve 25 and the upper surface of the annular portion 37. Also note that the number of thrust bearing portions 52 may be two or more. Also note that the thrust bearing portion 52 may alternatively be defined between the upper surface of the cap 26 and the lower surface of the annular portion 37.

As described above, a gap in the form of a bladder and including the radial bearing portion 51 and the thrust bearing portion 52 is defined between a combination of the sleeve 25 and the cap 26 and the combination of the shaft 31 and the annular portion 37. This gap includes a thrust gap defined between the upper surface or the lower surface of the annular portion 37 and a surface of the sleeve 25 or of the cap 26 which is axially opposite to the annular portion 37, and a radial gap defined between the outer circumferential surface of the shaft 31 and a surface of the sleeve 25 which is radially opposite to the shaft 31. The radial bearing portion 51 is defined in the radial gap, while the thrust bearing portion 52 is defined in the thrust gap. The lubricating oil 50 is continuously arranged in the gap including the thrust gap and the radial gap. The shaft 31 is supported through the lubricating oil 50 to be rotatable with respect to the sleeve 25 and the cap 26. In a situation in which the lubricating oil 50 has been fully arranged in the gap, a liquid surface of the lubricating oil 50 is defined only in the vicinity of the upper end portion of the sleeve 25 between the outer circumferential surface of the shaft 31 and the inner circumferential surface of the sleeve 25, that is, only at an upper end of the radial gap or in the vicinity of the upper end of the radial gap. That is, the fluid dynamic bearing 5 of this motor 1 is arranged to have a so-called full-fill structure, in which the liquid surface of the lubricating oil 50 is defined at only one position. Adoption of the full-fill structure, in which the lubricating oil 50 is arranged between the stationary portion 2 and the rotating portion 3, contributes to reducing swinging of the rotating portion 3 due to the orientation in which the motor 1 is placed and/or vibration, and also contributes to preventing a contact between the stationary portion 2 and the rotating portion 3 when a shock is applied to the motor 1 during the rotation of the motor 1.

The fluid dynamic bearing 5 is defined by the combination of the sleeve 25 and the cap 26 of the stationary portion 2, the combination of the shaft 31 and the annular portion 37 of the rotating portion 3, and the lubricating oil 50, which is arranged therebetween. The rotating portion 3 is supported by the fluid dynamic bearing 5, and rotates about the central axis 9. Note that the rotating portion 3 may alternatively be supported to be rotatable with respect to the stationary portion 2 by another bearing, such as, for example, a ball bearing or a plain bearing, instead of by the fluid dynamic bearing 5.

3. Example Modifications

While preferred embodiments of the present invention have been described above, it will be understood that the present invention is not limited to the above-described preferred embodiments.

Figure 7:
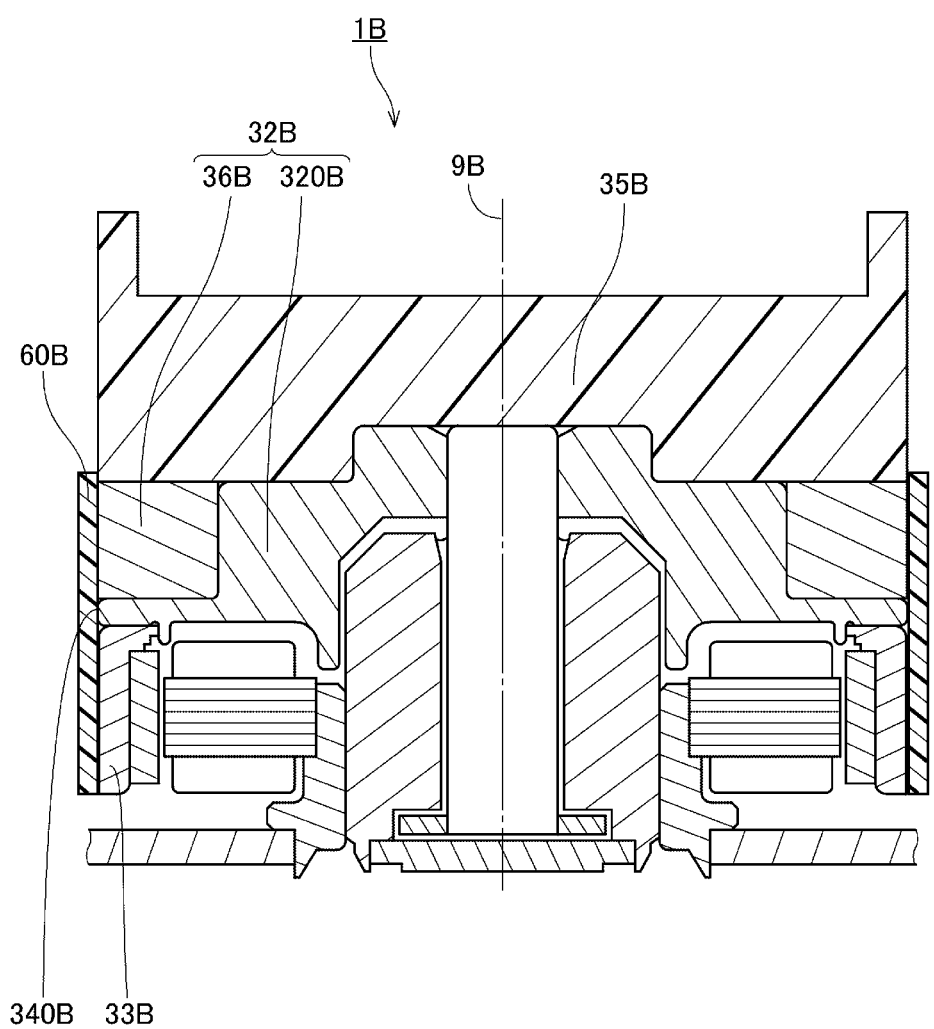
FIG. 7 is a vertical sectional view of a motor according to a modification of the second preferred embodiment.

FIG. 7 is a vertical sectional view of a motor 1B according to a modification of the second preferred embodiment. In the modification illustrated in FIG. 7, a seal portion 60B is arranged to cover an area extending from at least a portion of an outer circumferential surface of a flywheel 35B to a lower end of an outer circumferential surface of a cylindrical yoke 33B, which is fixed to a rotor hub portion 32B. As a result, a metal surface 340B of the rotor hub portion 32B, which has a high reflectivity, is more securely covered by the seal portion 60B. Accordingly, the likelihood that light will reach a gap between the rotor hub portion 32B and the yoke 33B to cause a diffuse reflection can be further reduced. Note that, in the case where the seal portion 60B is arranged to cover up to the lower end of the outer circumferential surface of the yoke 33B, a process such as a roughening process, a plating process, an oxidation treatment, or the like may not be performed on the outer circumferential surface of the yoke 33B.

Figure 8:
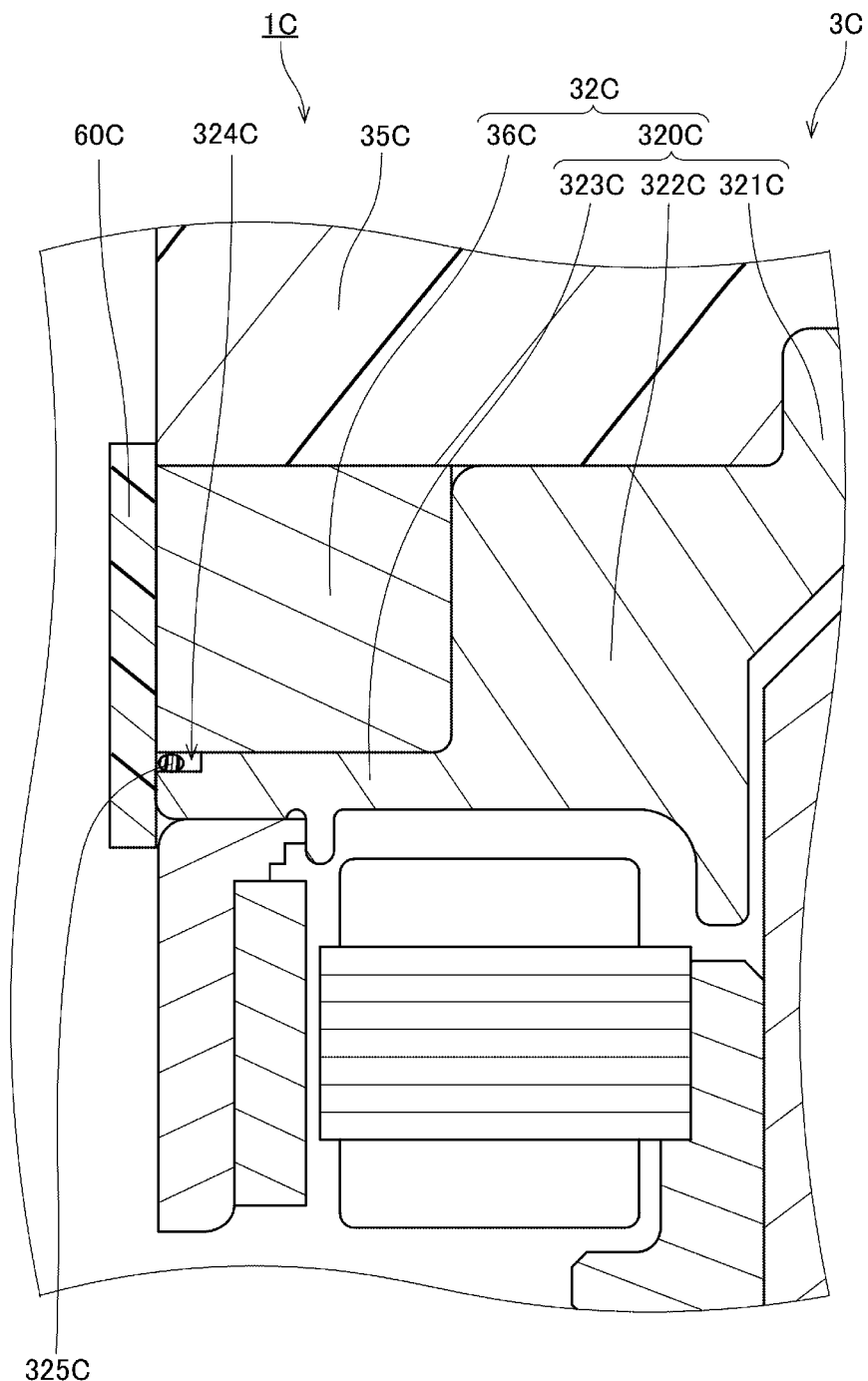
FIG. 8 is a partial vertical sectional view of a motor according to a modification of the second preferred embodiment.

FIG. 8 is a partial vertical sectional view of a motor 1C according to another modification of the second preferred embodiment. In the modification illustrated in FIG. 8, a rotor hub portion 32C includes a groove portion 324C recessed radially inward in at least a portion of an outer circumferential surface of a flange portion 323C or of an inertia portion 36C. The motor 1C may further include at least one balance correction member 325C having a sufficient mass to perform a function of correcting balance of a rotating portion 3C at one or more circumferential positions in the groove portion 324C. Balance of the motor 1C, which includes the rotating portion 3C, can thus be corrected after a flywheel 35C is fixed to the rotor hub portion 32C, and therefore, rotation of the motor 1C with the flywheel 35C mounted thereon can be further stabilized. In particular, the rotor hub portion 32C is covered with a seal portion 60C after the arrangement of the balance correction member(s) 325C, and this leads to more secure fixing of the balance correction member(s) 325C.

It is desirable that, in an outer circumferential surface of the rotor hub portion 32C, the groove portion 324C be arranged to extend in the circumferential direction over the entire circumferential extent of the rotor hub portion 32C. This makes it possible to arbitrarily choose the number of balance correction members 325C and the position(s) of the balance correction member(s) 325C, and this leads to improved operating efficiency. Note, however, that the groove portion 324C may alternatively be defined by a cut or cuts arranged at only one or more circumferential positions in the outer circumferential surface of the rotor hub portion 32C.

Figure 9:
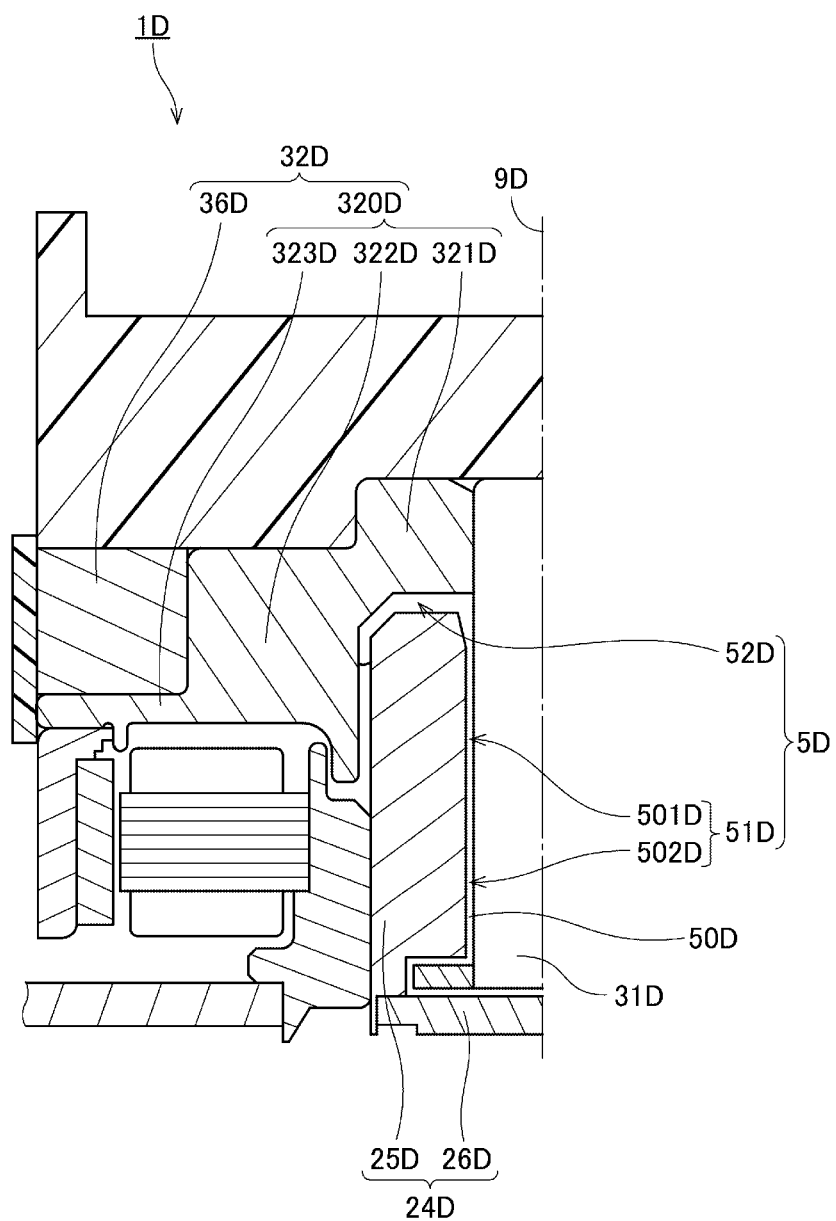
FIG. 9 is a partial vertical sectional view of a motor according to a modification of the second preferred embodiment.

FIG. 9 is a partial vertical sectional view of a motor 1D according to yet another modification of the second preferred embodiment. In the modification illustrated in FIG. 9, a rotor hub portion 32D is fixed to a circumference of an upper end portion of a shaft 31D. In addition, a lower surface of a joining portion 321D and an upper surface of a sleeve 25D are arranged axially opposite to each other with a slight gap (i.e., a second thrust gap) therebetween. In the modification illustrated in FIG. 9, a lubricating oil 50D is arranged in this second thrust gap as well. In addition, a second thrust groove array (not shown) is defined in one of the lower surface of the joining portion 321D and the upper surface of the sleeve 25D. While the motor 1D is running, the second thrust groove array induces a dynamic pressure in a portion of the lubricating oil 50D which is present between the lower surface of the joining portion 321D and the upper surface of the sleeve 25D. This produces an axial supporting force that supports the rotor hub portion 32D with respect to the sleeve 25D.

In a situation in which the lubricating oil 50D has been fully arranged in a gap, a liquid surface of the lubricating oil 50D is defined in the vicinity of an upper end portion of the sleeve 25D between an outer circumferential surface of the sleeve 25D and an inner circumferential surface of a cylindrical portion 322D of the rotor hub portion 32D. That is, a fluid dynamic bearing 5D of this motor 1D is arranged to have a so-called full-fill structure, in which the liquid surface of the lubricating oil 50D is defined at only one position.

That is, in the motor 1D illustrated in FIG. 9, at the second thrust gap, the lower surface of the joining portion 321D and the upper surface of the sleeve 25D are arranged axially opposite to each other with the lubricating oil 50D therebetween to define a second thrust bearing portion 52D. In addition, the lubricating oil 50D is continuously arranged in a gap including a radial bearing portion 51D and the second thrust bearing portion 52D. This leads to a more stable rotation of the motor 1D.

Note that a plain bearing (e.g., a sintered bearing) (not shown) impregnated with a lubricating oil may alternatively be used as a bearing 24D. In this case, it is desirable that a housing (not shown) be additionally arranged radially outside of the sleeve 25D to prevent an oil leakage. In this case, in a situation in which the lubricating oil 50D has been fully arranged in the gap, a liquid surface of the lubricating oil 50D is defined in the vicinity of an upper end portion of the housing between an outer circumferential surface of the housing and the inner circumferential surface of the cylindrical portion 322D of the rotor hub portion 32D. Similarly, at the second thrust gap, the lower surface of the joining portion 321D and the upper surface of the sleeve 25D are arranged axially opposite to each other with the lubricating oil 50D therebetween to define the second thrust bearing portion 52D.

Figure 10:
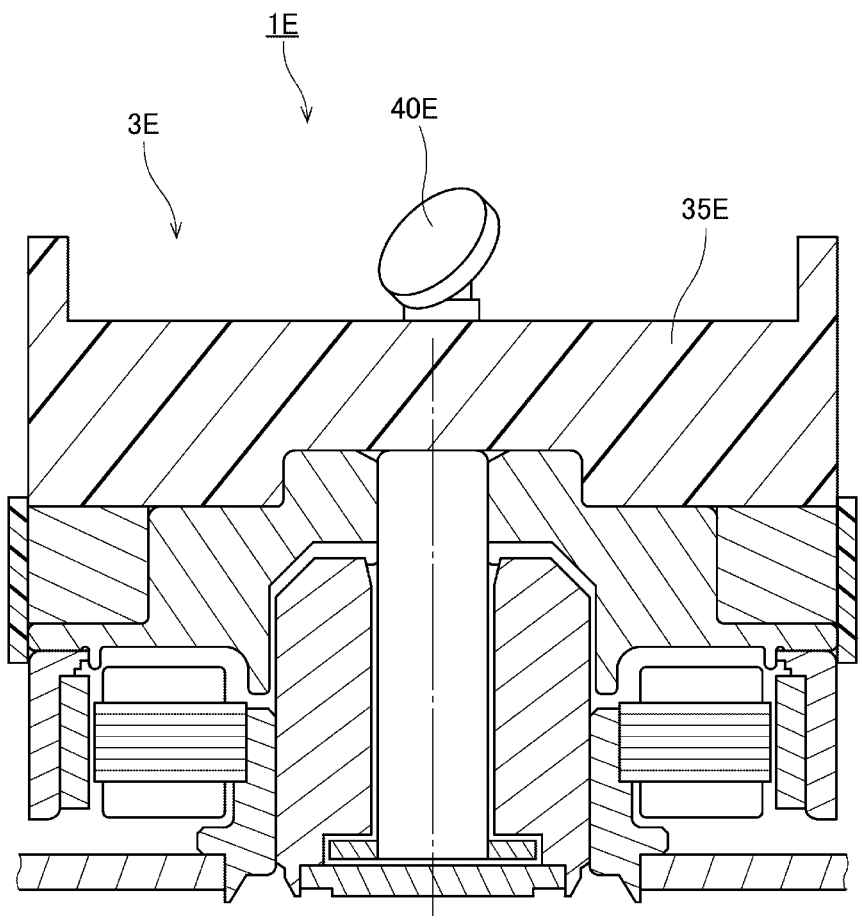
FIG. 10 is a vertical sectional view of a motor according to a modification of the second preferred embodiment.

FIG. 10 is a vertical sectional view of a motor 1E according to yet another modification of the second preferred embodiment. In the modification illustrated in FIG. 10, a rotating portion 3E includes a mirror 40E. The mirror 40E is supported by a flywheel 35E. Once the motor 1E is driven, the mirror 40E is caused to rotate together with the flywheel 35E. This allows light coming toward the flywheel 35E to be reflected while the light is deflected with a fixed cycle.

Figure 11:
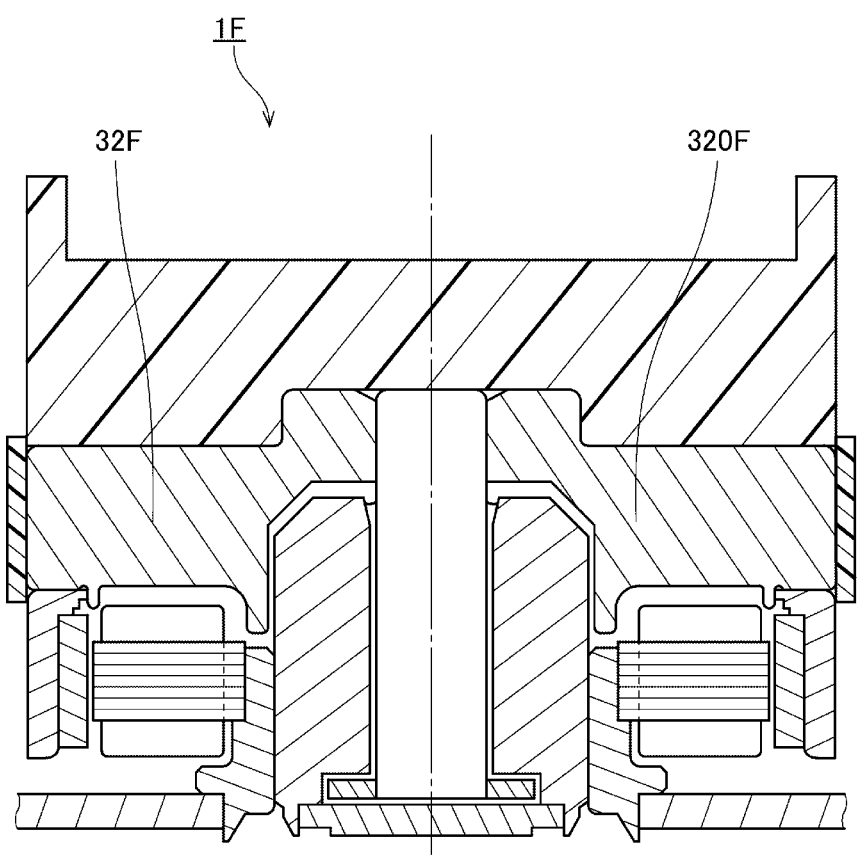
FIG. 11 is a vertical sectional view of a motor according to a modification of the second preferred embodiment.

FIG. 11 is a vertical sectional view of a motor 1F according to yet another modification of the second preferred embodiment. As illustrated in FIG. 11, a rotor hub portion 32F of the motor 1F may not include an inertia portion and be made up of only a hub 320F.

Note that the flywheel may be a resin injection-molded article produced with the inertia portion as an insert. In this case, a molten resin is poured into a cavity of a mold with the inertia portion arranged in the mold, and the resin is cured to complete manufacture of the flywheel. This achieves molding of the flywheel and fixing of the flywheel to the inertia portion at the same time. Thus, a reduction in the number of processes to manufacture the motor is achieved. Moreover, the flywheel and the inertia portion can be fixed to each other with increased strength.

Note that details of the structure and the shape of a motor according to a preferred embodiment of the present invention may differ from details of the structure and the shape of each motor as illustrated in the accompanying drawings of the present application. Also note that features of the above-described preferred embodiments and the modifications thereof may be combined appropriately as long as no conflict arises.

Preferred embodiments of the present invention are applicable to motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a stationary portion including a stator; and
a rotating portion supported to be rotatable about a central axis extending in a vertical direction with respect to the stationary portion, and including a shaft arranged to extend along the central axis; wherein
the stationary portion includes:
a bearing arranged to rotatably support the shaft; and
a base portion arranged to hold the stator;
the rotating portion includes:
a rotor hub portion arranged to extend in an annular shape around the shaft;
a magnet directly or indirectly fixed to the rotor hub portion, and arranged opposite to the stator;
a flywheel arranged axially above the rotor hub portion; and
a seal portion arranged to have a thickness smaller than a thickness of the magnet;
at least a portion of an outer circumferential surface of the rotor hub portion is a metal surface;
the metal surface has a reflectivity higher than a reflectivity of an outer circumferential surface of the flywheel and a reflectivity of a surface of the seal portion; and
the metal surface is covered with the seal portion.

2. The motor according to claim 1, wherein at least a portion of the metal surface of the rotor hub portion and at least a portion of the outer circumferential surface of the flywheel are arranged to axially overlap with each other.

3. The motor according to claim 1, wherein
the rotor hub portion includes:
an inertia portion being annular, made of a metal, and arranged to have a specific gravity greater than a specific gravity of the flywheel; and
a hub;
the hub includes:
a joining portion arranged to extend in an annular shape from an upper portion of the shaft;
a cylindrical portion arranged to extend in an axial direction from an outer circumferential portion of the joining portion; and
a flange portion arranged to extend radially outward from a lower portion of the cylindrical portion; and
the inertia portion is fixed to the cylindrical portion or the flange portion.

4. The motor according to claim 1, wherein the rotor hub portion is arranged to have a mass greater than a mass of the flywheel.

5. The motor according to claim 1, wherein the flywheel is made of a resin, and at least a portion of the rotor hub portion is made of a stainless metal.

6. The motor according to claim 1, wherein
the rotor hub portion includes a groove portion recessed radially inward in at least a portion of the outer circumferential surface thereof; and
the motor further comprises a balance correction member arranged in the groove portion.

7. The motor according to claim 6, wherein, in the outer circumferential surface of the rotor hub portion, the groove portion is arranged to extend in a circumferential direction over an entire circumferential extent of the rotor hub portion.

8. The motor according to claim 1, wherein at least a portion of the outer circumferential surface of the flywheel is covered with the seal portion.

9. The motor according to claim 1, wherein
the magnet is arranged radially outside of the stator;
the rotating portion further includes a cylindrical yoke fixed to a radially outer side of the magnet;
the yoke is fixed to the rotor hub portion;
an upper end of the seal portion is fixed to the outer circumferential surface of the flywheel; and
a lower end of the seal portion is fixed to an outer circumferential surface of the yoke.

10. The motor according to claim 1, wherein
the magnet is arranged radially outside of the stator;
the rotating portion further includes a cylindrical yoke fixed to a radially outer side of the magnet;
the yoke is fixed to the rotor hub portion; and
the seal portion is arranged to cover an area extending from at least a portion of the outer circumferential surface of the flywheel to a lower end of an outer circumferential surface of the yoke.

11. The motor according to claim 1, further comprising a thrust bearing portion at which a portion of the stationary portion and a portion of the rotating portion are arranged axially opposite to each other with a gap therebetween, the gap having a lubricating oil arranged therein, wherein a fluid dynamic pressure is induced in the lubricating oil.

12. The motor according to claim 11, wherein
the bearing includes a sleeve, and a disk-shaped cap arranged to close a lower end portion of the sleeve;
the rotating portion further includes a disk-shaped annular portion arranged to extend radially outward from a lower end of the shaft, and arranged axially opposite to the cap;
the gap includes:
a thrust gap defined between an upper surface or a lower surface of the annular portion and a surface of the sleeve or of the cap which is axially opposite to the annular portion; and
a radial gap defined between an outer circumferential surface of the shaft and a surface of the sleeve which is radially opposite to the shaft;
the thrust dynamic pressure bearing portion is defined in the thrust gap;
the lubricating oil is continuously arranged in the gap including the thrust gap and the radial gap; and
in a situation in which the lubricating oil has been fully arranged in the gap, a liquid surface of the lubricating oil is defined only at an upper end of the radial gap.

13. The motor according to claim 12, wherein
the gap further includes a second thrust gap defined between an upper surface of the sleeve and a lower surface of the rotor hub portion; and
the second thrust gap has a second thrust bearing portion defined therein.

14. The motor according to claim 1, wherein the rotating portion includes a mirror supported by the flywheel and arranged to reflect light coming toward the flywheel.

15. The motor according to claim 1, wherein the flywheel is arranged to have an outside diameter equal to an outside diameter of the rotor hub portion.

16. The motor according to claim 1, wherein the flywheel is arranged to have an axial dimension greater than an axial distance from a lower end surface of the stationary portion to an upper end surface of the rotor hub portion.

17. The motor according to claim 1, wherein
the metal surface is covered by the seal portion over an entire circumferential extent thereof; and
both circumferential end portions of the seal portion are arranged to overlap with each other.

18. The motor according to claim 1, wherein the seal portion is made of a resin, and the surface of the seal portion is black in color.

19. The motor according to claim 9, wherein at least the outer circumferential surface of the yoke is roughened.

20. The motor according to claim 9, wherein at least the outer circumferential surface of the yoke is black in color.

* * * * *